US012261416B2

(12) United States Patent
Klochkov

(10) Patent No.: US 12,261,416 B2
(45) Date of Patent: Mar. 25, 2025

(54) IONIZER EMITTER NOZZLES

(71) Applicant: Illinois Tool Works Inc., Glenview, IL (US)

(72) Inventor: Aleksey Klochkov, San Francisco, CA (US)

(73) Assignee: Illinois Tool Works Inc., Glenview, IL (US)

( * ) Notice: Subject to any disclaimer, the term of this patent is extended or adjusted under 35 U.S.C. 154(b) by 482 days.

(21) Appl. No.: 17/831,029

(22) Filed: Jun. 2, 2022

(65) Prior Publication Data

US 2022/0393441 A1 Dec. 8, 2022

Related U.S. Application Data

(60) Provisional application No. 63/197,208, filed on Jun. 4, 2021.

(51) Int. Cl.
*H01T 23/00* (2006.01)

(52) U.S. Cl.
CPC .................................... *H01T 23/00* (2013.01)

(58) Field of Classification Search
CPC . H01T 23/00; H01T 19/04; H05F 3/04; H05F 3/06
USPC ..................................................... 250/423 R
See application file for complete search history.

(56) References Cited

U.S. PATENT DOCUMENTS

| | | | | |
|---|---|---|---|---|
| 4,339,782 | A | 7/1982 | Yu | |
| 6,807,044 | B1 * | 10/2004 | Vernitsky | H01T 23/00 361/231 |
| 2007/0006478 | A1 * | 1/2007 | Kotsuji | H01T 19/00 34/96 |
| 2015/0123008 | A1 | 5/2015 | Fukada | |
| 2015/0282286 | A1 * | 10/2015 | Gefter | H01T 19/04 134/1.1 |

OTHER PUBLICATIONS

Int'l Search Report and Written Opinion Appln No. PCT/US2022/032103 mailed Sep. 22, 2022.
Simco-Ion, Technology Group, The Latest Ionization Tool with Offset Voltage and Feedback Control, Industry Exclusive Model 5645, https://www.facebook.com/simco.ion.technology/videos/new-products-introduction/250565230089085, accessed Apr. 28, 2021.

* cited by examiner

*Primary Examiner* — Jason L McCormack
(74) *Attorney, Agent, or Firm* — McAndrews, Held & Malloy, Ltd.

(57) ABSTRACT

An example apparatus for charge neutralization comprises: an emitter nozzle comprising: an emitter; and a housing configured to hold the emitter, the housing comprising a plurality of cams on an exterior of the housing; and a nozzle receptacle configured to enable insertion and removal of the emitter nozzle, and to hold the emitter nozzle in place during operation of the emitter nozzle, the nozzle receptacle comprising: a plurality of threads corresponding to the plurality of cams on the emitter nozzle, the plurality of threads having a first flank angle; and a plurality of shelves located at respective distal ends of the plurality of threads, the plurality of shelves having a second flank angle less than the first flank angle.

12 Claims, 5 Drawing Sheets

IONIZER EMITTER NOZZLES

BACKGROUND

This disclosure relates generally to ionization, and more particularly, to ionizer emitter nozzles.

Ion emitters of charge neutralizers generate and supply both positive ions and negative ions into the surrounding air or gas media. To generate gas ions, the amplitude of the applied voltage must be high enough to produce a corona discharge between at least two electrodes arranged as an ionization cell. In the ionization cell, at least one electrode is an ion emitter and another one may be a reference electrode.

SUMMARY

Methods and apparatus for adaptive charge neutralization are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
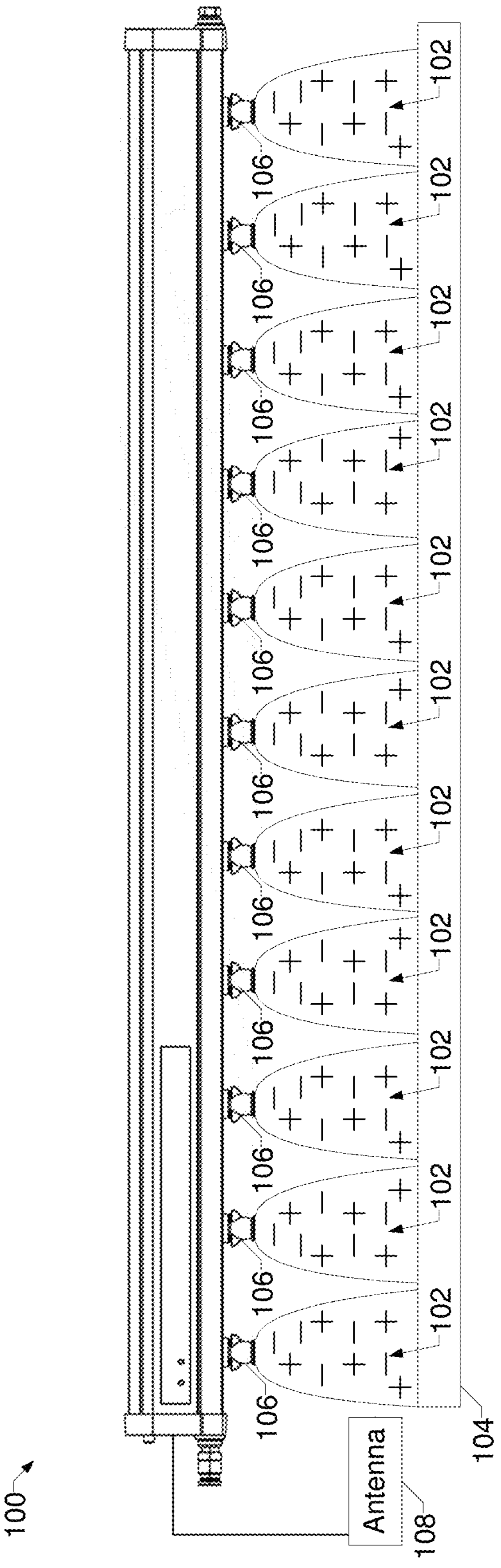
FIG. 1 illustrates an example AC charge neutralization system configured to control an ionization output based on balance voltage feedback, in accordance with aspects of this disclosure.

Ionizers, or charge neutralizers, emit positive and/or negative ions to discharge static electricity that may be present on a surface or substrate, such as in a manufacturing facility. Disclosed example methods and apparatus for charge neutralization can be used in class 1 cleanroom production environments, and are particularly useful for semiconductor chip manufacturing.

Conventional ion emitters are installed into a housing via a receptacle. Due to pressurization within the housing, the ion emitters and/or emitter nozzles holding the emitters are subject to forces that resist installation and/or encourage ejection from the housing. Due to friction forces associated with sealing elements during, installation and replacement of emitter nozzles involving multiple turns of conventional ion emitters could be fatiguing to the operator. Some other conventional ion emitter nozzles are installed using bayonet-type fittings. However, bayonet fittings require substantial insertion force to overcome the resistance from the sealing elements.

In contrast with conventional ion emitter nozzle assemblies, disclosed ion emitter nozzles and receptacles have threaded connections in which the threads have multiple sections. In some such examples, the nozzle receptacle is double threaded and the emitter housing includes cams configured to be threaded into the dual threads. A first section of each thread has a first flank angle (e.g., an angle defined by the pitch with respect to the perpendicular, circumferential line), and each thread terminates into a second section having a lower flank angle. In some such examples, the second section has a pitch angle of zero. The lower flank angle improves locking of the emitter nozzle in the installed position and reduces the likelihood of unintended unwinding or ejection of the emitter nozzle, while improving ease of installation.

The terms “ionization” and “charge neutralization” are used interchangeably in this document.

Disclosed example apparatus for charge neutralization include: an emitter nozzle having an emitter and a housing configured to hold the emitter, in which the housing includes a plurality of cams on an exterior of the housing; and a nozzle receptacle configured to enable insertion and removal of the emitter nozzle, and to hold the emitter nozzle in place during operation of the emitter nozzle, the nozzle receptacle including: a plurality of threads corresponding to the plurality of cams on the emitter nozzle, the plurality of threads having a first flank angle; and a plurality of shelves located at respective distal ends of the plurality of threads, the plurality of shelves having a second flank angle less than the first flank angle.

Some example apparatus further include a power supply, in which the nozzle receptacle is configured to conduct power from the power supply to the emitter nozzle when the emitter nozzle is installed in the nozzle receptacle. In some example apparatus, the housing of the emitter nozzle includes two cams, and the nozzle receptacle comprises a double thread.

In some example apparatus, the plurality of threads include between one-half and one full turn to install the emitter nozzle into the nozzle receptacle. In some example apparatus, the nozzle receptacle includes a seat configured to provide a seal against an exterior of the housing of the emitter nozzle, and the emitter nozzle includes a seal on an exterior of the housing such that the seal abuts the seat. Some such example apparatus further include an ionizer housing having a plurality of nozzle receptacles. In some example apparatus, an interior of the ionizer housing is pressurized with air, and the seat is configured to seal against the air pressure. In some example apparatus, the shelves are configured to prevent unwinding of the emitter nozzle from the nozzle receptacle by the air pressure.

In some example apparatus, the nozzle receptacle is injection molded. In some example apparatus, at least one of the shelves has a second flank angle of 0 degrees. In some example apparatus, at least one of the shelves has a protrusion between the threads and the shelves such that one of the cams must traverse the protrusion to reach the corresponding shelf from the thread and to reach the corresponding thread from the shelf. In some example apparatus, at least one of the shelves has a second flank angle of less than 0 degrees.

FIG. 1 illustrates an example AC charge neutralization system 100 configured to control an ionization output based on balance voltage feedback. The example AC charge neutralization system 100 outputs positive and negative ions 102 to neutralize electric charges on a target device or substrate 104.

To generate the ions 102, the example system 100 includes one or more ion emitter nozzles 106, which are coupled to one or more power supplies that provide a high voltage, high frequency AC signal for generation of the ions 102. The system 100 may include any number of emitter nozzles 106 to disperse ions 102 to a desired area or size of the target device or substrate 104. By alternating positive and negative ions, the example system 100 effectively neutralizes static charge present on the target device or substrate 104, while reducing or avoiding charging the target device or substrate 104 with the ions 102.

The system 100 of FIG. 1 alternates positive and negative ions by controlling the output voltage at the nozzles 106 to output consecutive pulses of positive ions and consecutive pulses of negative ions. The respective durations of consecutive positive and negative pulses may be controlled based on a desired balance. In contrast with conventional charge neutralization systems, the example system 100 achieves a balance voltage within +/−5V by measuring the balance voltage via an antenna 108 and adjusting the ion balance based on the measurements. For example, the system 100 may adjust the relative numbers or durations of consecutive positive and negative pulses to adjust the output balance. The antenna 108 may be positioned near the target 104 such that the antenna 108 measures a balance voltage representative of the output of system 100. Using the feedback from the antenna 108, the system 100 repeatedly (e.g., constantly) adjusts the balance of positive and negative ions.

The example system 100 includes a housing 110 that contains the power supply and the nozzles 106, as well as any other components in the system. The nozzles 106 may be installed and uninstalled from the system 100 to facilitate replacement of the nozzles 106 due to wear, contamination, and/or damage.

Figure 2:
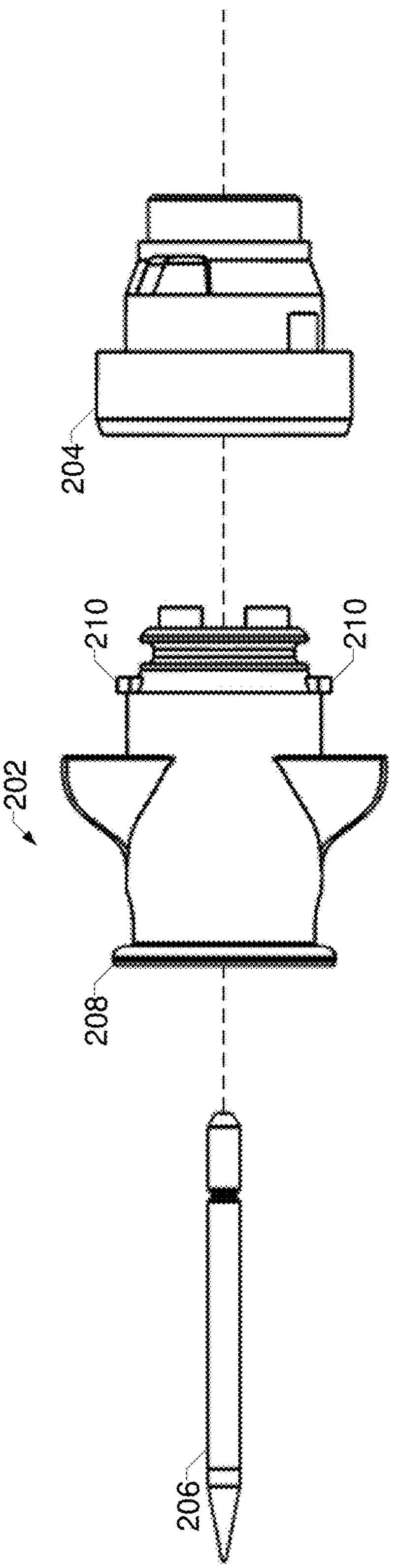
FIG. 2 is an exploded view of an example emitter assembly of FIG. 1.

FIG. 2 is an exploded view of an example emitter assembly 200 that may be used to implement the nozzles 106 of FIG. 1. In operation, the emitter assembly 200 receives a high voltage, high frequency signal from a power supply of the system 100, and outputs positive and negative ions based on the received voltage.

The emitter assembly 200 includes an emitter nozzle 202 which is configured to be installed into a nozzle receptacle 204. The nozzle receptacle 204 may be integral with a housing 110 of the system 100, while the emitter nozzle 202 is installed and uninstalled in the nozzle receptacle 204. The example nozzle receptacle 204 may further facilitate conduction of electrical signals to and/or from the emitter nozzle 202.

The emitter nozzle 202 includes an emitter 206 and an emitter housing 208. The example emitter 206 is removably installed into the emitter housing 208, which positions the emitter 206 for proper installation into the nozzle receptacle 204. The emitter housing 208 and/or the nozzle receptacle 204 may include one or more o-rings, gaskets, and/or other seals to avoid gas leakage between the emitter housing 208 and the nozzle receptacle 204.

As disclosed in more detail below, the example emitter nozzle 202 is screwed into the nozzle receptacle 204, which includes internal threads and shelves to avoid unintentional unscrewing of the emitter nozzle 202 from the receptacle 204. The emitter housing 208 includes two cams 210, which are threaded into the internal threads of the receptacle 204. In contrast with conventional emitter nozzles, the example emitter nozzle 202 and receptacle 204 are resistant to unintentional dethreading due to gas pressure on the emitter nozzle 202 from the interior of the housing 110.

Figure 3:
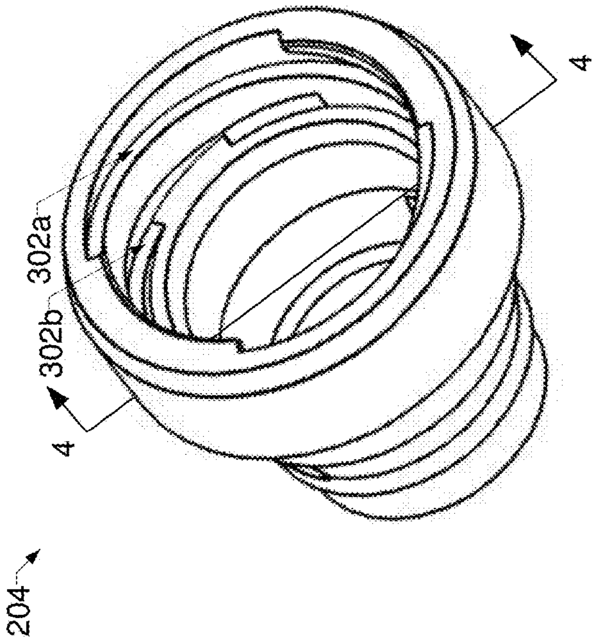
FIG. 3 is a perspective view of the example nozzle receptacle of FIG. 2.
Figure 4:
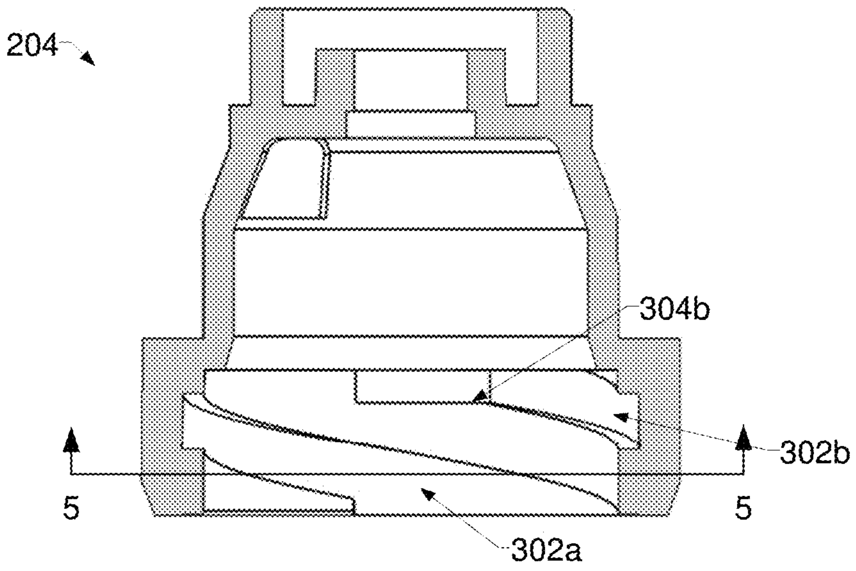
FIG. 4 is a cross-sectional view of the example nozzle receptacle of FIG. 2.

FIG. 3 is a perspective view of the example nozzle receptacle 204 of FIG. 2. FIG. 4 is a cross-sectional view of the example nozzle receptacle of FIG. 2. The nozzle receptacle 204 is threaded to enable screwing in of the emitter housing 208 via the cams 210. In the example of FIGS. 3 and 4, the nozzle receptacle 204 is double threaded. The threads 302*a*, 302*b* have a first flank angle, which may be selected to allow for installation in a quarter-turn, a half-turn, a three-quarter turn, a full-turn, and/or any other number of turns of the emitter nozzle 202 into the receptacle 204.

Figure 5:
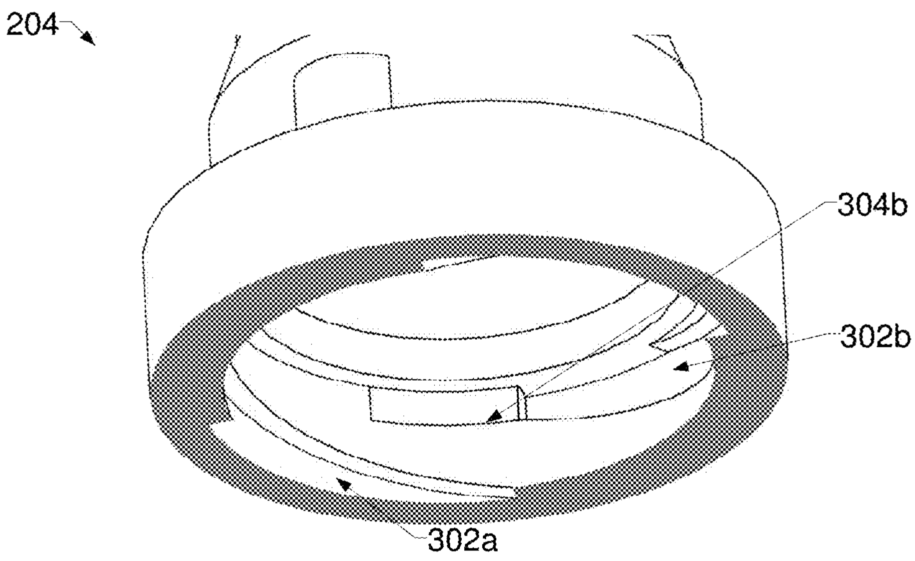
FIG. 5 is a more detailed perspective view of the threads and a shelf of the example nozzle receptacle of FIG. 2.

At the distal end of each of the threads 302*a*, 302*b*, the thread 302*a*, 302*b* includes a shelf portion 304*a*, 304*b* which has a reduced flank angle. FIG. 5 is a more detailed perspective view of the threads 302*a*, 302*b* and a shelf 304*b* of the example nozzle receptacle 204 of FIG. 2. In the example of FIGS. 3 and 4, the flank angle is reduced to zero at the shelf portion 304*a*, 304*b*. When installed, any outward pressure on the emitter housing 208 from the nozzle receptacle 204 does not result in translation to a dethreading force, even when combined with vibration or other effects that can cause unseating.

Figure 6:
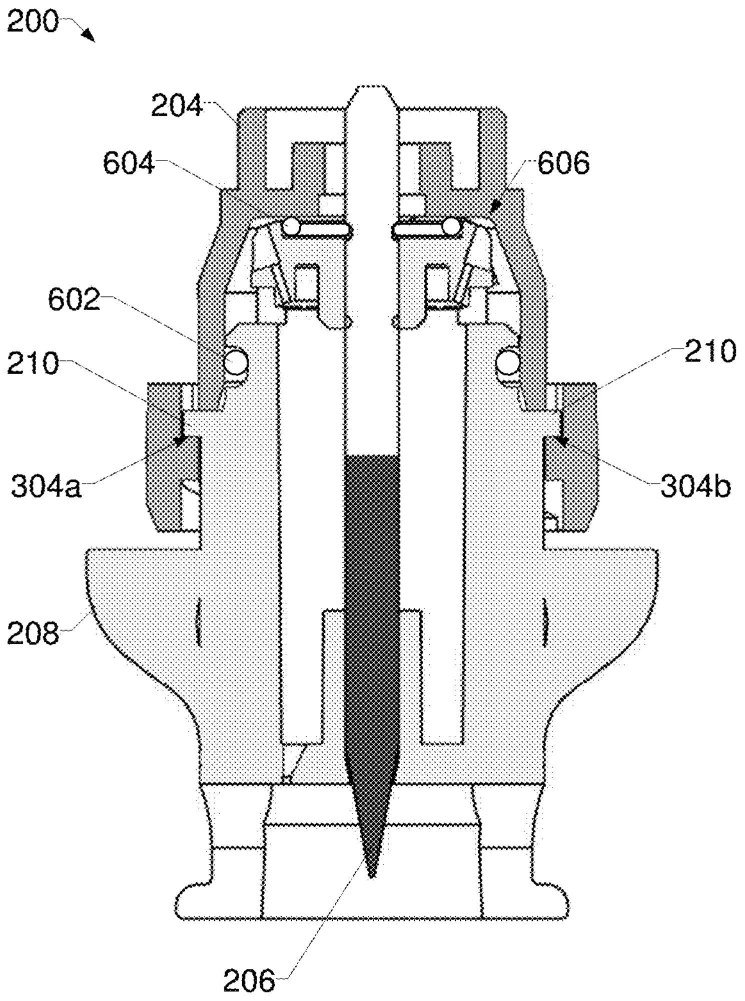
FIG. 6 is a cross-sectional view of the example emitter assembly of FIG. 2 in an installed configuration.

FIG. 6 is a cross-sectional view of the example emitter assembly 200 of FIG. 2 in an installed configuration. As shown in FIG. 6, the cams 210 are positioned against the shelf portions 304*a*, 304*b* of the threads 302*a*, 302*b*. In the installed position, the emitter 206 extends through the nozzle receptacle 204 to make electrical contact with the power supply.

Also illustrated in FIG. 6 are example seals 602, 604, which are positioned on an exterior of the emitter housing 208. The seals 602, 604 abut a seat 606 of the nozzle receptacle 204 and/or other locations within an interior of the nozzle receptacle. The seals 602, 604 reduce leakage of gas around an exterior of the emitter housing 208.

Figure 7:
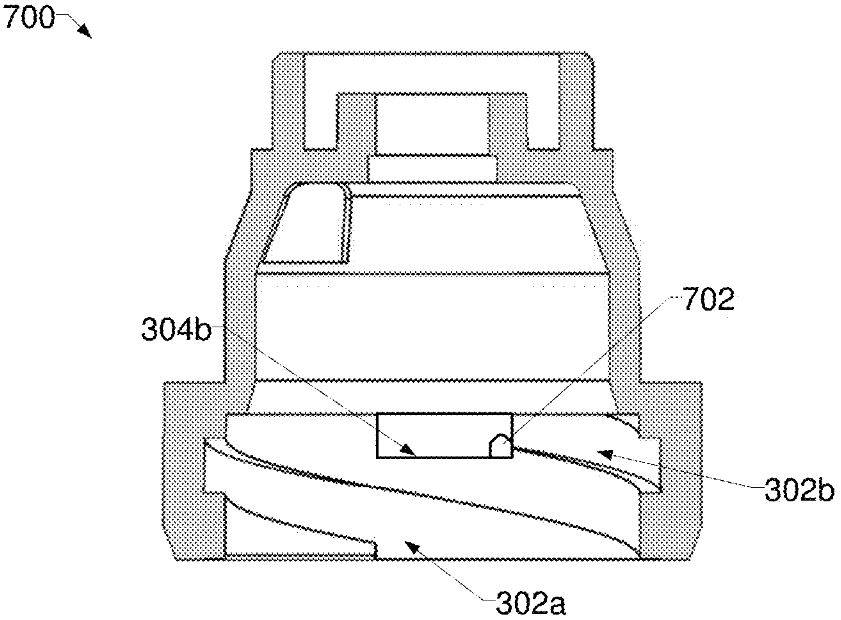
FIG. 7 is a cross-sectional view of another example implementation of the nozzle receptacle of FIG. 2, including a protrusion between the thread and the shelf.

FIG. 7 is a cross-sectional view of another example nozzle receptacle 700 that may be used to implement the nozzle receptacle 204 of FIG. 2. Similar to the nozzle receptacle 204 of FIG. 2, the nozzle receptacle 700 includes threads 302*a*, 302*b* having a shelf portion 304*a*, 304*b*. The example nozzle receptacle 700 further includes a protrusion 702 between the first portion of the thread 302*b* and the shelf 304*b*. One or both threads 302*a*, 302*b* may include a protrusion.

The example protrusion 702 further increases the movement and/or energy required for the cam 210 to move from the shelf portion 304*b* to the thread 302*b*. Thus, the protrusion 702 further reduces the likelihood of unintentional dethreading of the emitter nozzle 202 from the receptacle 204 without substantially increasing the difficulty of installation and uninstallation.

Figure 8:
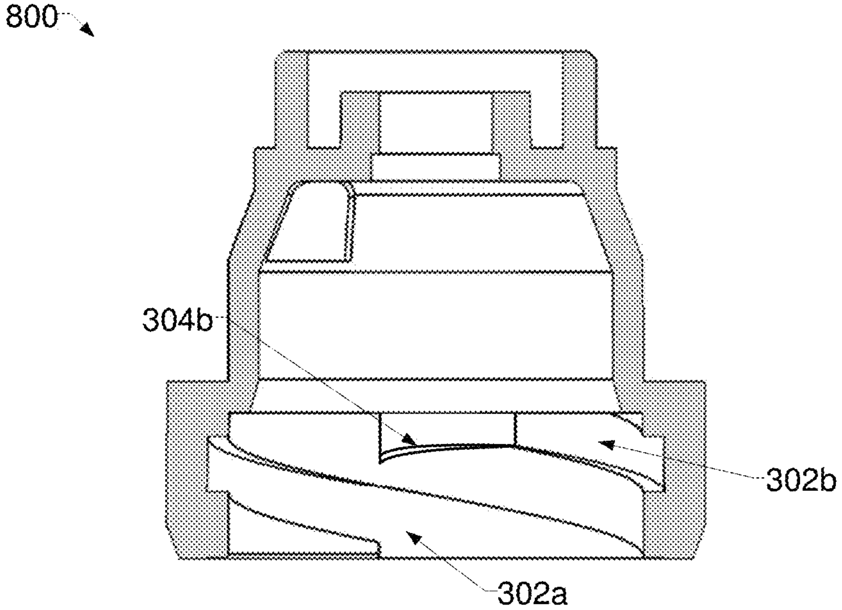
FIG. 8 is a cross-sectional view of another example implementation of the nozzle receptacle of FIG. 2, in which the shelf has a negative flank angle.

FIG. 8 is a cross-sectional view of another example nozzle receptacle 800 that may be used to implement the nozzle receptacle 204 of FIG. 2. Similar to the nozzle receptacle 204 of FIG. 2, the nozzle receptacle 700 includes threads 302*a*, 302*b* having a shelf portion 304*a*, 304*b*. In the example receptacle 800, the shelf portion 304*b* has a negative flank angle, in which the shelf portion 304*a* reverses the thread direction. The example shelf portion 304*b* with the negative flank angle may have a similar effect as the protrusion 702 of FIG. 7, which is to increase the movement and/or energy required for the cam 210 to move from the shelf portion 304*b* to the thread 302*b*. Thus, the shelf portion

304*b* further reduces the likelihood of unintentional dethreading of the emitter nozzle 202 from the receptacle 204 without substantially increasing the difficulty of installation and uninstallation.

In the example of FIG. 8, both shelf portions 304*a*, 304*b* include the negative flank angle for alignment of the emitter 206. The shelf portions 304*a*, 304*b* may have a negative flank angle for a portion or the entirety of the length of the shelf portions 304*a*, 304*b*.

Any of the example nozzle receptacles 204, 700, 800 of the illustrated examples may be constructed using any appropriate technique. Example construction or manufacturing techniques may involve, but are not limited to, injection molding and/or additive manufacturing.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An apparatus for charge neutralization, the apparatus comprising:
- an emitter nozzle comprising:
  - an emitter; and
  - a housing configured to hold the emitter, the housing comprising a plurality of cams on an exterior of the housing; and
- a nozzle receptacle configured to enable insertion and removal of the emitter nozzle, and to hold the emitter nozzle in place during operation of the emitter nozzle, the nozzle receptacle comprising:
  - a plurality of threads corresponding to the plurality of cams on the emitter nozzle, the plurality of threads having a first flank angle; and
  - a plurality of shelves located at respective distal ends of the plurality of threads, the plurality of shelves having a second flank angle less than the first flank angle.

2. The apparatus as defined in claim 1, further comprising a power supply, the nozzle receptacle configured to conduct power from the power supply to the emitter nozzle when the emitter nozzle is installed in the nozzle receptacle.

3. The apparatus as defined in claim 1, wherein the housing of the emitter nozzle comprises two cams, and the nozzle receptacle comprises a double thread.

4. The apparatus as defined in claim 1, wherein the plurality of threads comprise between one-half and one full turn to install the emitter nozzle into the nozzle receptacle.

5. The apparatus as defined in claim 1, wherein the nozzle receptacle comprises a seat configured to provide a seal against an exterior of the housing of the emitter nozzle, and the emitter nozzle comprises a seal on an exterior of the housing such that the seal abuts the seat.

6. The apparatus as defined in claim 5, further comprising an ionizer housing having a plurality of nozzle receptacles.

7. The apparatus as defined in claim 6, wherein an interior of the ionizer housing is pressurized with air, and the seat is configured to seal against the air pressure.

8. The apparatus as defined in claim 6, wherein the shelves are configured to prevent unwinding of the emitter nozzle from the nozzle receptacle by the air pressure.

9. The apparatus as defined in claim 1, wherein the nozzle receptacle is injection molded.

10. The apparatus as defined in claim 1, wherein at least one of the shelves has a second flank angle of 0 degrees.

11. The apparatus as defined in claim 10, wherein at least one of the shelves has a protrusion between the threads and the shelves such that one of the cams must traverse the protrusion to reach the corresponding shelf from the thread and to reach the corresponding thread from the shelf.

12. The apparatus as defined in claim 1, wherein at least one of the shelves has a second flank angle of less than 0 degrees.

* * * * *